(12) United States Patent
Koever et al.

(10) Patent No.: US 9,469,058 B2
(45) Date of Patent: Oct. 18, 2016

(54) SEAT STRUCTURE AND METHOD FOR THE PRODUCTION THEREOF

(71) Applicant: Johnson Controls Technology Company, Holland, MI (US)

(72) Inventors: Axel Koever, Köln (DE); Gerhard Bäck, Schwertberg (AT)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/442,893

(22) PCT Filed: Nov. 15, 2013

(86) PCT No.: PCT/EP2013/073919
§ 371 (c)(1),
(2) Date: May 14, 2015

(87) PCT Pub. No.: WO2014/076227
PCT Pub. Date: May 22, 2014

(65) Prior Publication Data
US 2015/0328811 A1 Nov. 19, 2015

(30) Foreign Application Priority Data
Nov. 15, 2012 (DE) .................. 10 2012 220 854

(51) Int. Cl.
*B60N 2/44* (2006.01)
*B29C 45/14* (2006.01)
*B29B 11/08* (2006.01)
*B29C 45/00* (2006.01)
*B29C 70/48* (2006.01)
(Continued)

(52) U.S. Cl.
CPC .......... *B29C 45/14811* (2013.01); *B29B 11/08* (2013.01); *B29C 45/0005* (2013.01); *B29C 45/14786* (2013.01); *B29C 67/246* (2013.01); *B29C 70/48* (2013.01); *B60N 2/686* (2013.01); *B29K 2077/00* (2013.01); *B29K 2309/08* (2013.01); *B29L 2031/58* (2013.01)

(58) Field of Classification Search
CPC ................... B29C 45/14811; B29C 45/0005; B29C 45/14786; B29C 70/48; B29C 67/246; B29B 11/08; B60N 2/686; B29K 2077/00; B29K 2309/08; B29L 2031/58
See application file for complete search history.

(56) References Cited

U.S. PATENT DOCUMENTS

| | | | |
|---|---|---|---|
| 5,988,757 A | 11/1999 | Vishey et al. | |
| 2005/0140168 A1* | 6/2005 | Emerling | B29C 45/1635 296/146.7 |
| 2006/0261508 A1* | 11/2006 | Lustiger | B29C 45/0005 264/140 |

(Continued)

FOREIGN PATENT DOCUMENTS

| | | |
|---|---|---|
| CN | 1 436 119 A | 8/2003 |
| DE | 196 50 854 C1 | 3/1998 |

(Continued)

*Primary Examiner* — Philip Gabler
(74) *Attorney, Agent, or Firm* — McGlew and Tuttle, P.C.

(57) ABSTRACT

A seat structure (1) and a method for the production thereof (1) are provided. A preliminary injected molded article (6) is injected-molded into an injection mold and is subsequently provided with fiber layers in the same injection mold, the layers are filled, at the end, with reactive components. The reactive components are mixed in a mixing chamber directly before injection into the injection mold to form a reactive matrix. The injection takes place prior the reaction of the reactive matrix.

16 Claims, 3 Drawing Sheets

(51) Int. Cl.
  *B29C 67/24* (2006.01)
  *B60N 2/68* (2006.01)
  B29K 77/00 (2006.01)
  B29L 31/58 (2006.01)
  B29K 309/08 (2006.01)

(56) References Cited

U.S. PATENT DOCUMENTS

2007/0077374 A1\* 4/2007 Cowelchuk ......... B29C 45/1671
  428/31
2009/0295011 A1\* 12/2009 Smith .................. B29C 44/086
  264/101
2010/0063191 A1\* 3/2010 Hirono ...................... C08J 3/12
  524/284
2011/0135934 A1 6/2011 Seidel et al.
2011/0244743 A1\* 10/2011 Scherzer ................ B29C 70/48
  442/59
2012/0234455 A1 9/2012 Nuyan et al.

FOREIGN PATENT DOCUMENTS

| DE | 10 2008 047564 A1 | 3/2010 |
| DE | 10 2009 040901 A1 | 3/2011 |
| EP | 1 724 098 A1 | 11/2006 |
| EP | 2 489 499 A1 | 8/2012 |
| WO | 2011/151710 A2 | 12/2011 |

\* cited by examiner

SEAT STRUCTURE AND METHOD FOR THE PRODUCTION THEREOF

CROSS REFERENCE TO RELATED APPLICATIONS

This application is a United States National Phase Application of International Application PCT/EP2013/073919 filed Nov. 15, 2013, and claims the benefit of priority under 35 U.S.C. §119 of German Patent Application DE 10 2012 220 854.2 filed Nov. 15, 2012, the entire contents of which are incorporated herein by reference.

FIELD OF THE INVENTION

The present invention relates to a seat structure and to a method for production thereof.

BACKGROUND OF THE INVENTION

State of the art for construction of thermoplastic, fiber-reinforced components is the GMT (glass fiber mat thermoplastic) method which is used for structural applications, wherein glass fiber-reinforced plastic sheets are stacked, heated and molded in a flow-molding method. In this way, it is possible to create ribbed structures which are used, for example, in rear seating. A more recent process is the use of what are called organosheets in a thermoforming process or in combination with an in-mold coating process. This can be effected subsequently or in one step. In this case, the organosheets consist of a fibrous woven fabric which has already been provided with a thermoplastic matrix (e.g. PA6: nylon-6) in an upstream process and is processed to give sheets. The advantage over GMT is the much lower structural weight as a result of the use of continuous fibers in woven form. A further option is that of using mixed fabrics consisting of thermoplastic and reinforcing fibers which can be processed in a pressing process. Likewise known, is a D-LFT pressing method (long fiber-reinforced plastics) in which long glass fiber pellets are compounded with the matrix in an extruder and placed into a press mold as a material strand. A combination of various methods is possible here. With regard to RIM (reactive injection molding) methodology, injection moldings are flooded with a reactive polyurethane component in order to achieve a corresponding surface configuration. However, this does not have any reinforcing character.

SUMMARY OF THE INVENTION

It is an object of the present invention to specify an improved seat structure and an improved method for production thereof.

In a method of the invention for production of a seat structure, a pre-molded part is injection-molded in an injection mold and then provided in the same injection mold with fiber layers which are subsequently filled with reactive components, wherein the reactive components are mixed in a mixing chamber immediately before injection into the injection mold to provide a reactive matrix, wherein the injection is effected before any reaction of the reactive matrix has concluded.

The method of the invention is what is called thermoplastic reinforced reactive injection molding (TR-RIM).

For this purpose, what is called in situ injection molding methodology is used, in which a dry semifinished fibrous product is reactively impregnated with a matrix in a closed mold.

The seat structure component is divided into two parts: a pre-molded part and a reinforcing layer. In this case, the pre-molded part is injection-molded in a conventional manner and then provided, for example in a two-component process in the same system, with the fiber layers which are subsequently filled with reactive components. In a reaction which starts when these components are mixed, the reinforcing layer becomes cohesively bonded to the pre-molded part to form a component. The reaction of the components begins when they are mixed in a mixing chamber immediately prior to the injection thereof into the system, in such a way that only after the fiber layers have been fully impregnated does the reaction progress to such an extent that the viscosity of the reactive matrix rises and/or crystallization takes place.

In one embodiment of the invention, the pre-molded part can be used as a seal for the reactive matrix, for example by providing the pre-molded part with a protruding region angled toward the fiber layer as a seal for the reactive matrix.

This technique can also be used in connection with the flooding of injection moldings with polyurethane for surface configuration.

In order to achieve homogeneous fiber impregnation, the fiber layers may additionally be embossed at the edge, so as to form a corresponding backpressure, which can prevent the matrix from moving too far. This eliminates subsequent trimming of the reinforcing layer. The pressure zone may be adjusted such that all fibers are surrounded by the matrix. Alternatively, a vacuum may additionally be applied in order to optimize the filling process.

By means of the method, it is possible to inexpensively bond dry semifinished fibrous products having different fiber angles and layers to a pre-molded part which may include a ribbed structure for example. In this case, the reactive process gives rise to a matrix comprising higher molecular weights than comparable injection-molded materials.

In one embodiment of the invention, the reactive components comprise at least one monomer component, for example ε-caprolactam.

Moreover, the reactive components may comprise a catalyst and/or an activator.

The use of the raw materials (monomer, glass fiber) dispenses with costly processing steps beforehand The specific sealing technique likewise makes it possible to dispense with a downstream trimming process. The combination of injection molding technology with continuous fiber-reinforced surfaces makes it possible to integrate novel component functions in one process. Because the pressure required in the filling of the fiber structure is low as a result of the low viscosity of the monomer component, it is possible to distinctly reduce the size of a plant used for production. This promotes economically viable manufacture.

The thermoplastic continuous fiber-reinforced seat structure is produced without the use of already prefabricated organosheets and without subsequent trimming.

Compared to conventional seat structures made from steel, it is possible by means of the method of the invention to produce considerably lighter, for example at least 30% lighter, but mechanically stable seat structures at low cost in an automated industrial production process within short cycle times, for example, less than 300 s. The weight saving thus achieved, when the seat structure is used in a motor vehicle seat, for example a front seat or a rear seat, can lead to improved fuel efficiency and reduced $CO_2$ emissions.

The monomer components of the thermoplastic matrix, for example PA6 (ε-caprolactam), are used in order to impregnate fibers, for example glass or carbon fibers, by means of injection molding technology. The reaction of the components begins when they are mixed in the mixing chamber immediately before they are injected into the system, but only after injection and full impregnation of the fiber layers within the casting does it progress to such an extent that the viscosity of the reactive matrix rises and/or crystallization of the thermoplastic matrix takes place. Once the reaction has ended, the part can be removed from the casting and used.

The in situ polymerization for impregnation of the fibers within the casting is enabled by the monomer component of the thermoplastic matrix and its extremely low viscosity (for example 4 mPas). This enables the injection of the components and the impregnation of the fiber pre-molded part before the reaction has concluded. The thermoplastic matrix used is, for example, nylon-6 (PA6) based on ε-caprolactam monomer. Nylon-6 is formed by hydrolytic ring-opening polymerization of caprolactam monomer. By virtue of the low viscosity of the monomer component, it is possible to achieve the embedding of all fibers into the thermoplastic matrix, even when carbon fibers are used. It is likewise possible to create fine structures, for example ribs and undercuts. In contrast, the injection of the ready-polymerized thermoplastic matrix and the impregnation of the fibers therewith is barely possible because of the high viscosity of the finished thermoplastic matrix.

The fibers may take the form of woven fibers, laid scrims (NCF: non-crimp fabrics, i.e. unidirectional, bidirectional or multiaxial scrim constructions) or of textile knits made from various materials, for example glass, carbon, polyamide or natural fibers.

In one embodiment of the invention, a casting of the injection mold is heated prior to the introduction of the reactive components.

A seat structure of the invention has been produced by means of the method of the invention and comprises a pre-molded part cohesively bonded to a reinforcing layer of fibers filled and impregnated with a reactive matrix.

In this case, the pre-molded part may comprise a protruding region angled inward toward the reinforcing layer for sealing of the reactive matrix.

In addition, the fibers may be compressed and/or embossed in a region at one edge of the pre-molded part.

The seat structure may be part of a motor vehicle seat, for example of a front seat or of a rear seat.

The invention is elucidated in detail with reference to the schematic figures appended. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
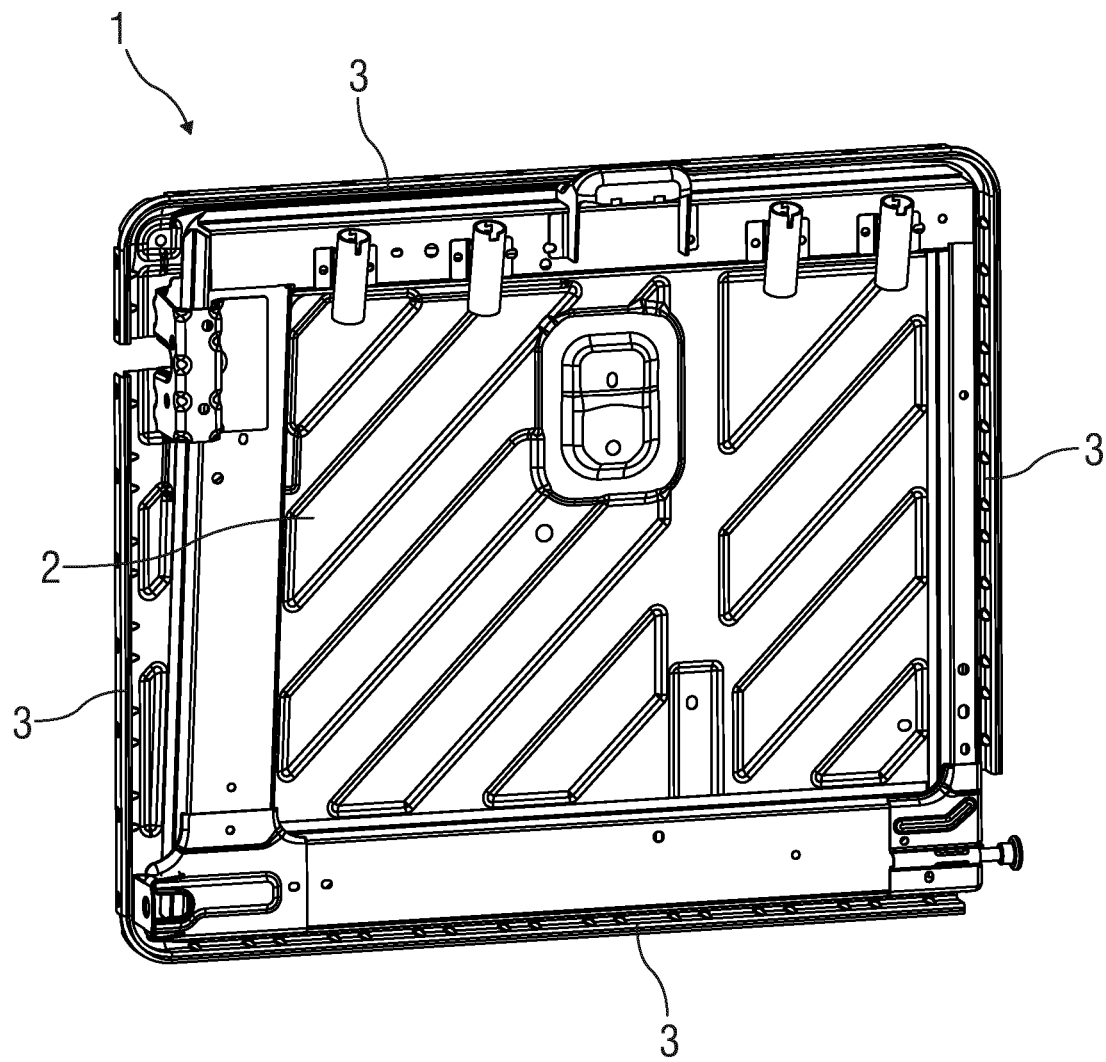
FIG. 1 is a perspective view of a seat structure made from steel according to prior art.

Corresponding parts are given the same reference numerals in all the drawings.

FIG. 1 shows a perspective view of a seat structure 1 having a rear wall 2 made, for example, from steel sheet of thickness 0.6 mm, bounded by profiles 3 made, for example, from steel of thickness 1.0 to 1.2 mm, according to prior art. The seat structure has a high mechanical stability but is relatively heavy, for example 12.8 kg.

Figure 2:
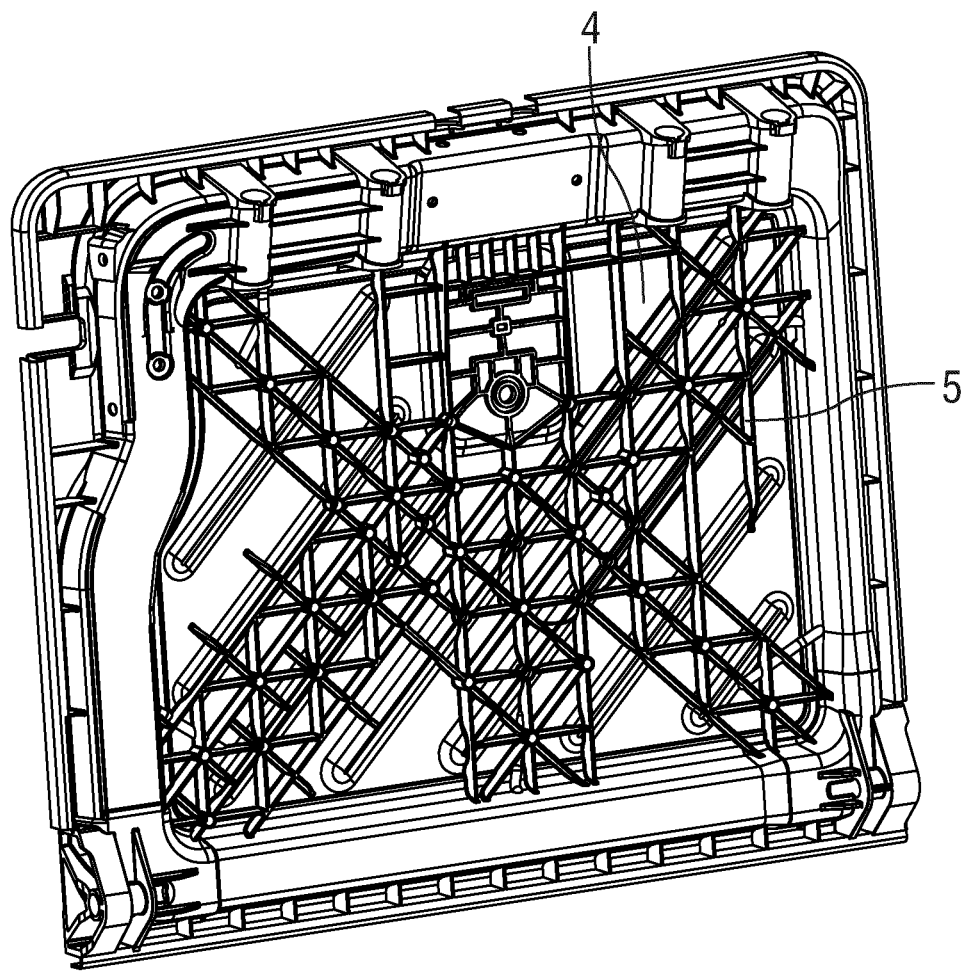
FIG. 2 is a perspective view of a seat structure made from glass fiber-reinforced thermoplastic matrix according to prior art.

FIG. 2 shows a perspective view of a seat structure 1 made from a glass fiber-reinforced thermoplastic matrix according to prior art. The seat structure 1 comprises organosheets 4 made from a glass fiber-reinforced thermoplastic matrix, for example comprising PA6 and of thickness 1.5 mm. Further provided are reinforcing ribs 5 made from PA6 with 30%-40% glass fibers. The predominant use of semifinished products makes the seat structure 1 lighter than that shown in FIG. 1, but also causes higher production costs.

Figure 3:
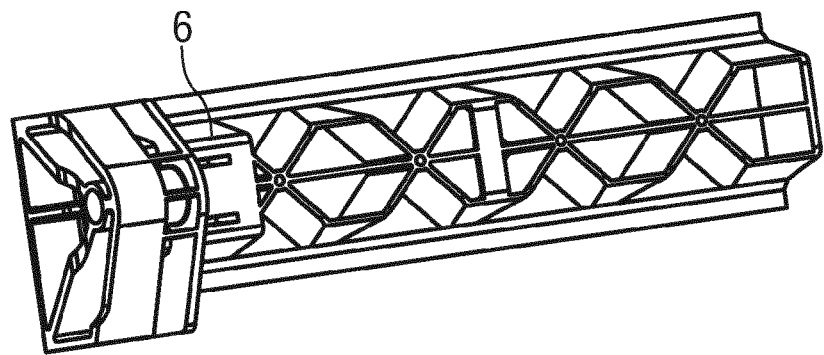
FIG. 3 is a perspective view of a pre-molded part for production of a seat structure.

FIG. 3 shows a perspective view of a pre-molded part 6 for production of a seat structure 1 by means of a method of the invention.

The pre-molded part 6 is injection-molded in a conventional manner in an injection molding system and then provided in the same system with a reinforcing layer 7 composed of fibers which are subsequently filled and impregnated with reactive components, for example caprolactam monomer+catalyst+activator. In a polymerization reaction that starts when these components are mixed, the reinforcing layer 7 becomes cohesively bonded to the pre-molded part 6 to give a component, the seat structure 1. The reaction of the components begins when they are mixed in a mixing chamber immediately before they are injected into the injection molding system, such that only after the reinforcing layer has been fully impregnated does the reaction progress to such an extent that the viscosity of the reactive matrix rises and/or crystallization takes place.

The pre-molded part 6 can be used as a seal for the reactive matrix. The sealing against the fibers which, by virtue of this measure, remain securely concealed behind the thermoplastic edge and against the liquid matrix is implemented by a protruding region 9 of the pre-molded part 6 angled inward toward the fiber layer. The pre-molded part 6 has already been provided with the protruding region 9 in the course of production thereof.

In a seal region 8 at the edge of the pre-molded part 6, the fibers may be compressed and/or embossed, so as to form a corresponding backpressure, which prevents the matrix from moving too far and can achieve homogeneous fiber impregnation.

The fibers may take the form of a fabric (of a web) or of a laid scrim (for example NCF: non-crimp fabrics, i.e. unidirectional, bidirectional or multiaxial scrim constructions) or of a textile knit made from various materials, for example glass, carbon, polyamide or natural fibers.

Figure 4:
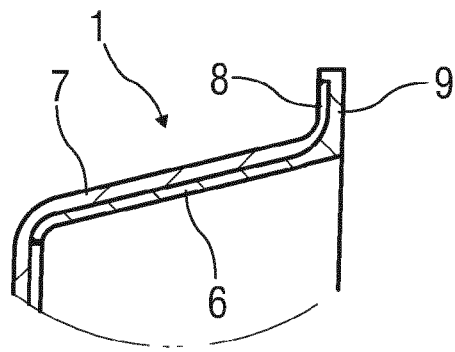
FIG. 4 is a section view of a detail of the pre-molded part with a reinforcing layer.

FIG. 4 shows a section view of a detail of the seat structure 1, comprising the pre-molded part 6 with the reinforcing layer 7.

Figure 5:
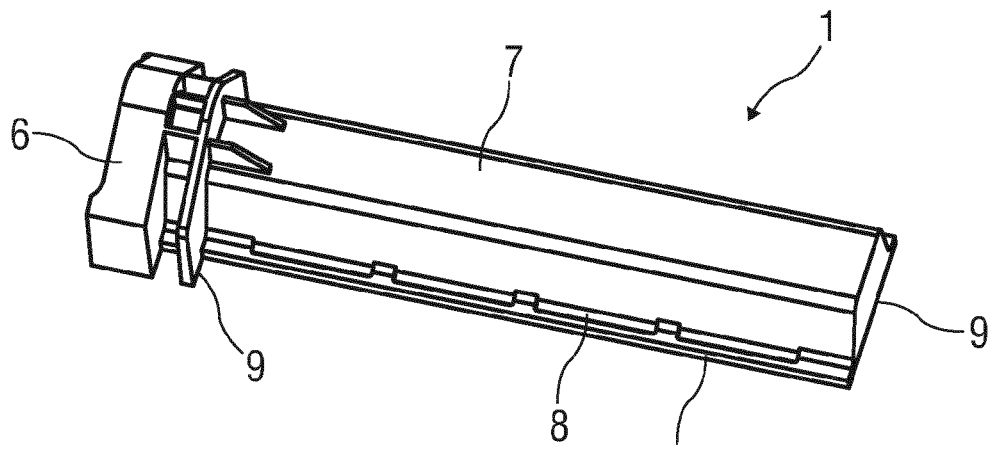
FIG. 5 is a perspective view of the pre-molded part with the reinforcing layer.

FIG. 5 shows a perspective view of the seat structure 1, comprising the pre-molded part 6 with the reinforcing layer 7.

The use of TR-RIM technology (thermoplastic reinforced reactive injection molding) makes it possible to dispense with semifinished products, since the material arises within the casting, in a similar manner to resin transfer molding (RTM). In this way, the costs of the continuous fiber-reinforced plastic parts can be reduced by 15%, for example.

The seat structure 1 can be produced in a injection molding apparatus, wherein the components to form the polymer are introduced into a heated casting.

While specific embodiments of the invention have been shown and described in detail to illustrate the application of the principles of the invention, it will be understood that the invention may be embodied otherwise without departing from such principles.

The invention claimed is:

1. A method for producing a seat structure, the method comprising the steps of:
   injection molding a part in an injection mold;
   subsequently providing in the same injection mold, fiber layers which are subsequently filled with reactive components;
   mixing the reactive components in a mixing chamber immediately before injection into the injection mold to provide a reactive matrix;
   effecting the injection before any reaction of the reactive matrix has concluded, the part being used as a seal for the reactive matrix, wherein the part is provided with a protruding region angled toward the fiber layer as a seal for the reactive matrix.

2. The method as claimed in claim 1, wherein the fiber layers are compressed or embossed at one edge.

3. The method as claimed in claim 1, wherein a vacuum is applied to the injection mold.

4. The method as claimed in claim 1, wherein fibers used are glass fibers, carbon fibers, polyamide fibers or natural fibers.

5. The method as claimed in claim 1, wherein fibers are in the form of fabrics, laid scrims or textile knits made from one or more materials.

6. The method as claimed in claim 1, wherein the reactive components comprise a monomer component.

7. The method as claimed in claim 6, wherein the monomer component used is ε-caprolactam.

8. The method as claimed in claim 1, wherein the reactive components comprise a catalyst.

9. The method as claimed in claim 1, wherein the reactive components comprise an activator.

10. The method as claimed in claim 1, wherein a casting of the injection mold is heated prior to the introduction of the reactive components.

11. The method as claimed in claim 1, wherein the fiber layers are compressed and embossed at one edge.

12. A seat structure, comprising a part cohesively bonded to a reinforcing layer of fibers filled and impregnated with a reactive matrix, the seat structure being formed by a method comprising the steps of:
    injection molding the part in an injection mold;
    subsequently providing, in the same injection mold, the layer of fibers which are subsequently filled with reactive components;
    mixing the reactive components in a mixing chamber immediately before injection into the injection mold to provide a reactive matrix; and
    effecting the injection before any reaction of the reactive matrix has concluded, the part comprising a protruding region angled inward toward the reinforcing layer for sealing of the reactive matrix.

13. The seat structure as claimed in claim 12, wherein the fibers have been compressed or embossed in a seal region at one edge of the part.

14. The seat structure as claimed in claim 12, wherein the fibers have been compressed and embossed in a seal region at one edge of the part.

15. A vehicle seat comprising a seat structure comprising:
    a part cohesively bonded to a reinforcing layer of fibers filled and impregnated with a reactive matrix, the seat structure being formed by a method comprising the steps of:
    injection molding the part in an injection mold;
    subsequently providing, in the same injection mold, the layer of fibers which are subsequently filled with reactive components;
    mixing the reactive components in a mixing chamber immediately before injection into the injection mold to provide a reactive matrix; and
    effecting the injection before any reaction of the reactive matrix has concluded, wherein the fibers are at least one of compressed and embossed in a seal region at one edge of the part.

16. The vehicle seat structure as claimed in claim 15, wherein the part comprises a protruding region angled inward toward the reinforcing layer for sealing of the reactive matrix.

* * * * *